ated Feb. 2, 1960

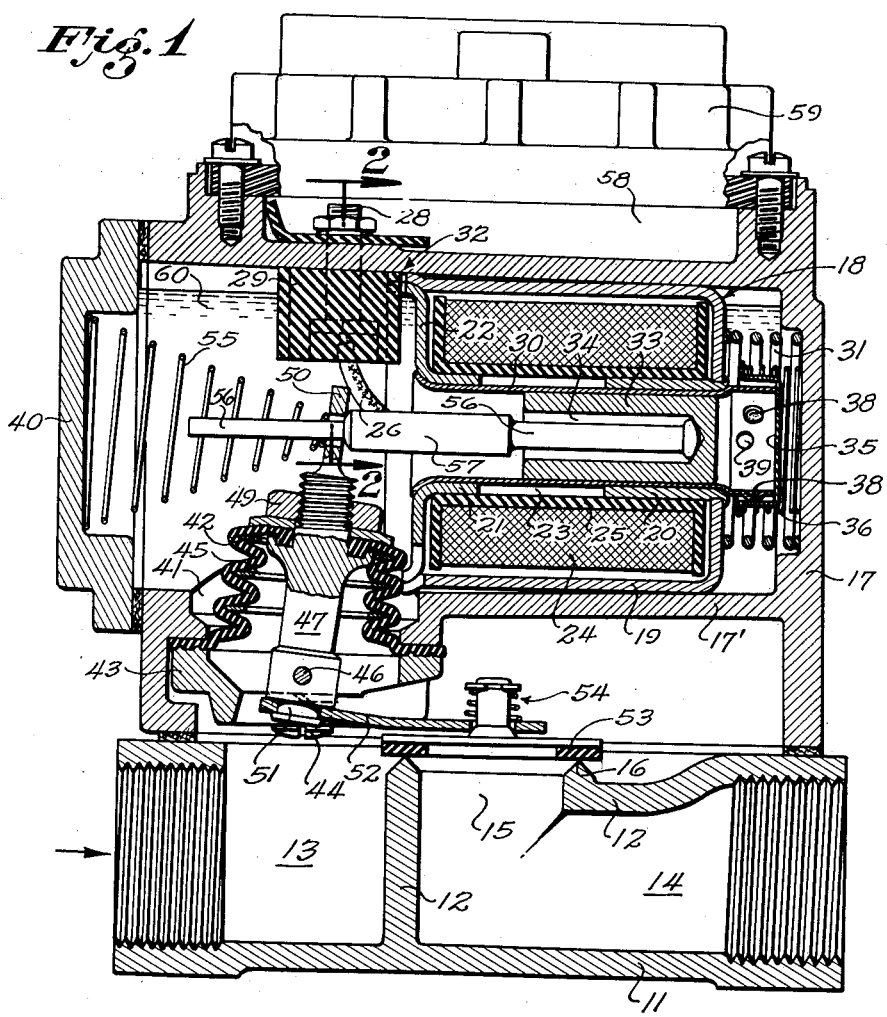

2,923,519

DASHPOT CONTROLLED SOLENOID VALVE

William A. Ray, North Hollywood, Calif., assignor to General Controls Co., Glendale, Calif., a corporation of California Application August 24, 1956, Serial No. 606,115

6 Claims. (Cl. 251—54)

This invention relates to solenoid devices for operating valves and other control devices and is in some respect an improvement on the invention disclosed in my copending application Serial No. 594,280, filed June 27, 1956, now abandoned, and in a copending continuation-in-part thereof Serial No. 672,688, filed July 18, 1957.

It is an object of this invention to provide pressure operated means for retarding the movement of a reciprocable solenoid-plunger in one of its operative directions, which means is responsive to very low pressure differentials and is therefore quick-acting.

Another object of the invention is to provide retarding means of the character described in the preceding object which is independent of the solenoid plunger and does not impair the magnetic circuit of the operator.

Another object is to provide a solenoid operator, embodying the features set forth in the preceding objects, which is compact, consumes a relatively small amount of current, and is hum-free when energized by alternating current.

Another object is to provide a solenoid operator which has particular utility in connection with the operation of a fluid control valve.

For full understanding of the invention, and further appreciation of its features and advantages, reference is to be had to the following detailed description and accompanying drawing, and to the appended claims.

In the drawing:

Figure 1 is a sectional view of a solenoid valve structure embodying this invention;

Figure 2 is a fragmentary section taken along the line 2—2 of Fig. 1; and

Figure 3 is a fragmentary sectional view showing an adjustable by-pass opening for the check-valve closure 35 of Fig. 1.

Referring first more particularly to Figs. 1 and 2 of the drawing, the numeral 11 indicates a valve casing having a passage therethrough which is divided by an angled partition 12 to form an inlet chamber 13 and an outlet chamber 14, the horizontal portion of the partition having a port 15 around whose inlet end is an annular valve-seat 16.

Mounted on the valve casing, so as to enclose the open top thereof, is a hollow body 17 having at its right-hand end means, including walls 17', forming a generally cylindrical socket for a solenoid device or electromagnet generally indicated at 18, the solenoid device and the socket being conformingly tapered and arranged so that when the device is seated there is a space between its right-hand end and the adjacent side wall of the body.

The solenoid device 18 has a magnetic frame comprising a cup-shaped outer shell 19, a tubular member 20 inside the shell and rigidly secured at its outer end in a central opening through the end wall of the shell, and another tubular member 21 inside the shell in alignment with member 20 and having at its outer end a flange portion 22 fitting the mouth of the shell and secured thereto as by welding. The inner ends of the tubular members 20, 21 are spaced apart to provide a magnetic air-gap 23. In the annular space between shell 19 and members 20, 21 is an energizing coil 24 wound on a bobbin 25 and having leads 26 which extend through openings 27 (Fig. 2) in the shell-flange 22 to a pair of sub-terminals 28 mounted in an insulating block 29 and projecting sealingly through openings in the top of body-portion 17'.

Fitting snugly inside the tubular frame-members 20, 21 is a cylindrical guide-tube 30, of thin nonmagnetic material, whose right-hand end portion (outside member 20) is expanded, and its left-hand extremity flared around, and soldered to, the mouth of member 21 to hold the guide tube securely in place. A spring 31, compressed between the right-hand end of the solenoid device and the adjacent side wall of the body, serves to maintain the left top edge of the device in abutment with the insulating block 29, there being a rib and notch arrangement indicated at 32 for orienting the device about its axis. Reciprocable inside the guide tube 30 is a cylindrical armature or solenoid plunger 33 having a deep axial recess 34.

Spacedly surrounding the expanded right-hand portion of the guide tube and cooperable with the edge at the extremity thereof is a cup-shaped closure 35, preferably of thin light material such as aluminum, which is urged toward seated position by the force of a light spring 36 compressed between the adjacent side wall of the body and a flange at the mouth of the closure. The space at the right of the solenoid device is in free communication with the space at its left by way of passages 37 (see Fig. 2) between the body portion 17' and the solenoid device. The expanded extension of guide tube 30 has on its side a plurality (three, as shown) of bumps or projections 38 for guiding the closure 35, and a restricted opening 39 by-passing the check valve formed by this closure.

In the left-hand wall of body 17 is a large opening closed by a cap 40, and in the curved lower portion 17' of the body, at its left, is an opening 41 leading to the inlet chamber 13 of the valve casing and closed by a flexible bellows 42, of material such as synthetic rubber, whose bottom flange is clamped to the body around opening 41 by an annular member 43 fastened by screws 44, there being stiffening ribs or rings 45 in the convolutions of the bellows. Pivoted at its lower end on a pin 46 mounted in openings in member 43 is a round arm 47 whose upper portion extends through opening 41 and is provided with a collar to which the upper end of bellows 42 is sealingly clamped by a nut 49 cooperating with screwthreads on the arm. At its top arm 47 is machined to form a flat portion 50. Secured to the bottom of arm 47, by means of a rivet portion 51 on the arm, is a generally-flat horizontal arm 52 which carries on its free end a closure disk 53 cooperable with the valve seat 16; there being a floating connection 54, of conventional form, between arm 52 and the closure disk.

The pivoted arm 47 and closure arm 52 are biased in clockwise direction by the force of a spring 55 compressed between cap 40 and the flat top portion 50 of arm 47, rocking of arms 47, 52 in this direction being limited by the seating of closure 53. Loosely supported at its left in an opening through the top portion of arm 47 is a rod 56 which projects into the recess 34 of the plunger and has a rounded tip engageable with the bottom of the recess, the rod having an enlarged median portion 57 engageable with arm 47. In the top of body 17 is a shallow recess 58 over which is a cover 59, of molded insulating material, for mounting of terminals (not shown) electrically connected to the sub-terminals 28. The hollow interior of body 17 is almost filled with a viscous liquid indicated at 60.

The parts are shown in normal position in the drawing. When current is passed through coil 24 the plunger 33 is attracted leftward to a position wherein it bridges the air-gap 23 and floats magnetically in that position. The movement of rod 56, 57 accompanying that movement of the plunger effects counterclockwise rocking of arms 47, 52 to unseat the main valve-closure 53. When coil 24 is deenergized the parts return to the positions shown in the drawing under the force of spring 55.

When the plunger is attracted leftward, its movement is retarded since liquid from the reservoir formed by the hollow interior of body 17 can flow into the right-hand low-pressure end of the plunger tube 30 only by way of the restricted opening 39; the check valve formed by closure 35 being held tightly seated because of the difference of pressure across it, and the clearance between the plunger and tube being small enough that the viscous liquid cannot flow around the plunger.

The resultant slow-opening of the main valve-closure 53 has particular advantage when the solenoid valve is employed for controlling supply of fuel gas to a furnace burner, since if initial supply of gas to the burner is at too high a rate there is the danger of the "roll back" of the fire that may occur before the furnace stack has reached the temperature necessary to produce sufficient draft.

When the solenoid device is deenergized, movement of the plunger toward the right, and closing of the main valve, are prompt due to opening of the check valve under the pressure of the liquid on its inner surface.

The check-valve closure 35 is so light (being of 0.018 inch thick aluminum in a typical embodiment) and the force of its bias spring 36 being only just sufficient to maintain the closure lightly on its seat, that the closure can virtually float in the viscous liquid and respond instantly to pressure differences across it caused by operative movements of the plunger.

By arranging the check valve on the end of the plunger tube, rather than on the plunger itself, the area of the check valve can be made so large (especially when the end of the plunger tube is expanded, as shown) that only a very small pressure differential is required to effect unseating and tight-seating of the check valve; the flow-capacity of the check valve being so large that the check valve does not significantly impede the flow of liquid while it is open.

Another advantage of the present arrangement of the check valve is that the magnetic circuit of the solenoid device is not impaired, as it would be if the check valve were arranged to control flow through a passage in the plunger.

By the use of liquid of suitable viscosity as a seal between the plunger and guide tube, the plunger can be of relatively small diameter and clearanced from the tube by a practical amount readily maintained in production. Because of the film of liquid in the clearance space between the plunger and tube, movement of the plunger toward the right (while the check valve is open) is retarded somewhat depending on the viscosity of the liquid. When the solenoid device is energized by alternating current, the film of liquid between the plunger and tube serves to substantially eliminate A.C. vibration or hum, as is fully described in my aforementioned copending application Serial No. 672,688. Elimination of A.C. hum is especially necessary when the plunger is arranged to float magnetically in the tube, as described; however, the retarding means of this invention is equally applicable to an arrangement wherein the plunger engages a stop when attracted.

The degree of viscosity of the liquid necessary for sealing the clearance space around the plunger and for preventing A.C. hum depends on the area of the co-operating surfaces of the plunger and guide tube, on the clearance between these parts (which normally does not exceed .005–.008 inch diametrical for magnetic reasons), and on the force tending to move the plunger, which force is small when the operator is employed in connection with the operation of a domestic fuel-gas valve, for which purpose this operator has particular utility as mentioned above. While liquids such as petroleum oils may be employed, those of the silicone type (such as the methyl silicone fluids) are preferred because of the small change of viscosity of these silicone liquids over a wide range of temperature.

An adjustable by-pass opening for the check valve is shown in Fig. 3 and comprises a screw 63 threaded in an opening (normally sealed by a screw-cap 64) through a boss on the side wall of the body. The screw 63 has an unthreaded inner portion 65 received in an opening through the end wall of closure 35 and provided with a metering notch 66. Inasmuch as the closure is seated when the by-pass opening formed by notch 66 is effective, the flow-capacity of the by-pass can be accurately determined by adjustment of screw 63. The fit of portion 65 is, of course, made by such that it does not interfere with the operation of the check valve.

While specific embodiments of my invention are disclosed herein, it is to be understood that modifications may be made within the spirit of the invention and that I intend that no limitation be placed on the invention except as defined by the scope of the appended claims.

I claim as my invention:

1. In a solenoid valve for controlling supply of fuel to a gas burner: a valve casing having a passage therethrough; a main valve for controlling flow through said passage; a solenoid device mounted on the outside of said casing and comprising a guide tube having unobstructed open ends and a solenoid plunger reciprocable in said tube between alternate operative positions and means biasing said plunger to one of said positions; solenoid means around said tube for attracting the plunger to the other of said positions; an operative connection between the plunger and said main valve and extending into said passage through an opening in said casing, said connection being spaced from the walls of said opening; flexible means joined to the casing and said connection and sealingly closing the space around the connection in said opening; means at the outside of the casing forming with said flexible means a reservoir with which both ends of said guide tube communicate; viscous liquid in said reservoir and said guide tube; and a fluid-pressure-operated check valve comprising a disk-like closure cooperable with one end of the guide tube and having means to impede flow of said liquid through that end when the plunger is attracted by said solenoid means, whereby such movement of the plunger and the resultant operation of said main valve are retarded; said connection being arranged so that attraction of the plunger effects opening of the main valve.

2. A solenoid valve according to claim 1 wherein said closure is arranged to cooperate with the outer edge of said one end of said guide tube.

3. In a solenoid-powered operator: a guide tube having unobstructed open ends; a solenoid plunger reciprocable in said guide tube between alternative operative positions and means biasing said plunger to one of said positions, said plunger fitting said tube relatively closely; solenoid means around said guide tube for attracting said plunger to the other of said positions; means forming a reservoir with which at least one of the ends of said guide tube communicates; viscous liquid in said reservoir and said guide tube; and a fluid-pressure-operated check valve, separate from said plunger, comprising a disk-like closure cooperable with said one end of the guide tube, means biasing said closure to close said one end and having means to impede flow of said liquid through that end of the tube when the plunger is attracted by said solenoid means, whereby such movement of the plunger is retarded; said closure being so related to said one end of the tube that, under pressure conditions produced by return of the plunger to its biased position, the closure assumes a position wherein flow of the liquid through the check valve is substantially unimpeded; said check valve forming the sole restriction to flow of liquid through said one end of the tube.

4. A solenoid-powered operator according to claim 3 wherein said closure is arranged to cooperate with the outer edge of said one end of the guide tube.

5. A solenoid valve according to claim 1 wherein the specific gravity of said closure is substantially equal to that of said viscous liquid so that the closure can virtually float in said viscous liquid.

6. A solenoid valve according to claim 3 wherein the specific gravity of said closure is substantially equal to that of said viscous liquid so that the closure can virtually float in said viscous liquid.

References Cited in the file of this patent

UNITED STATES PATENTS

| | | |
|---|---|---|
| 747,853 | Cheyney | Dec. 22, 1903 |
| 1,389,140 | Hodgkins | Aug. 30, 1921 |
| 1,508,391 | Greenwood | Sept. 16, 1924 |
| 1,625,796 | Denison | Apr. 26, 1927 |
| 1,730,688 | Rippl | Oct. 8, 1929 |
| 2,622,622 | Ray | Dec. 23, 1952 |
| 2,735,047 | Garner | Feb. 14, 1956 |
| 2,752,453 | Wallace | June 26, 1956 |

FOREIGN PATENTS

| | | |
|---|---|---|
| 535,463 | Great Britain | Apr. 9, 1941 |